Nov. 25, 1930.   C. J. KLEIN   1,782,969
BEARING
Filed Oct. 15, 1927   3 Sheets-Sheet 3
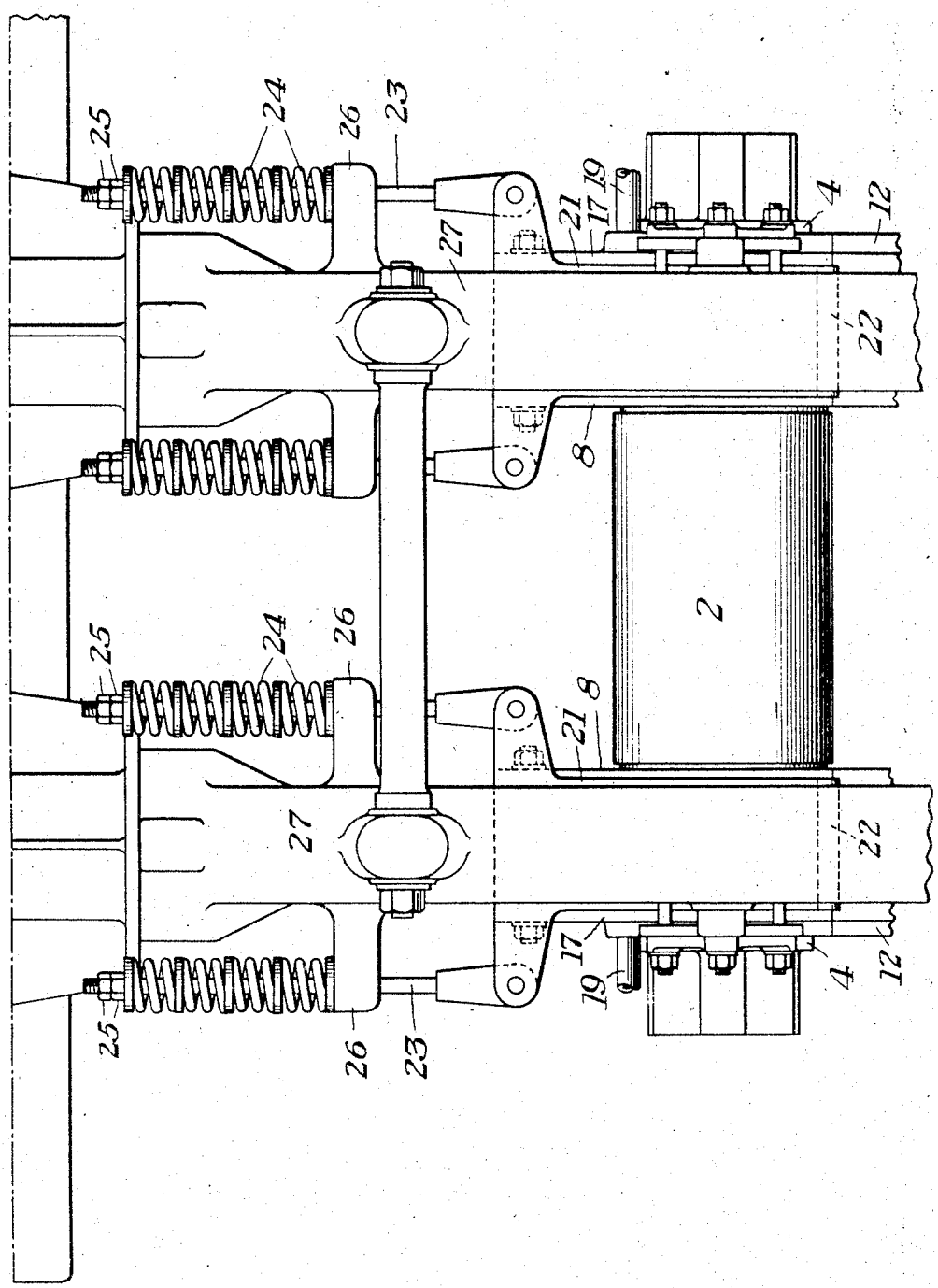
INVENTOR
Clarence J. Klein
by Byrnes, Stebbins & Parmelee
his attorneys Patented Nov. 25, 1930

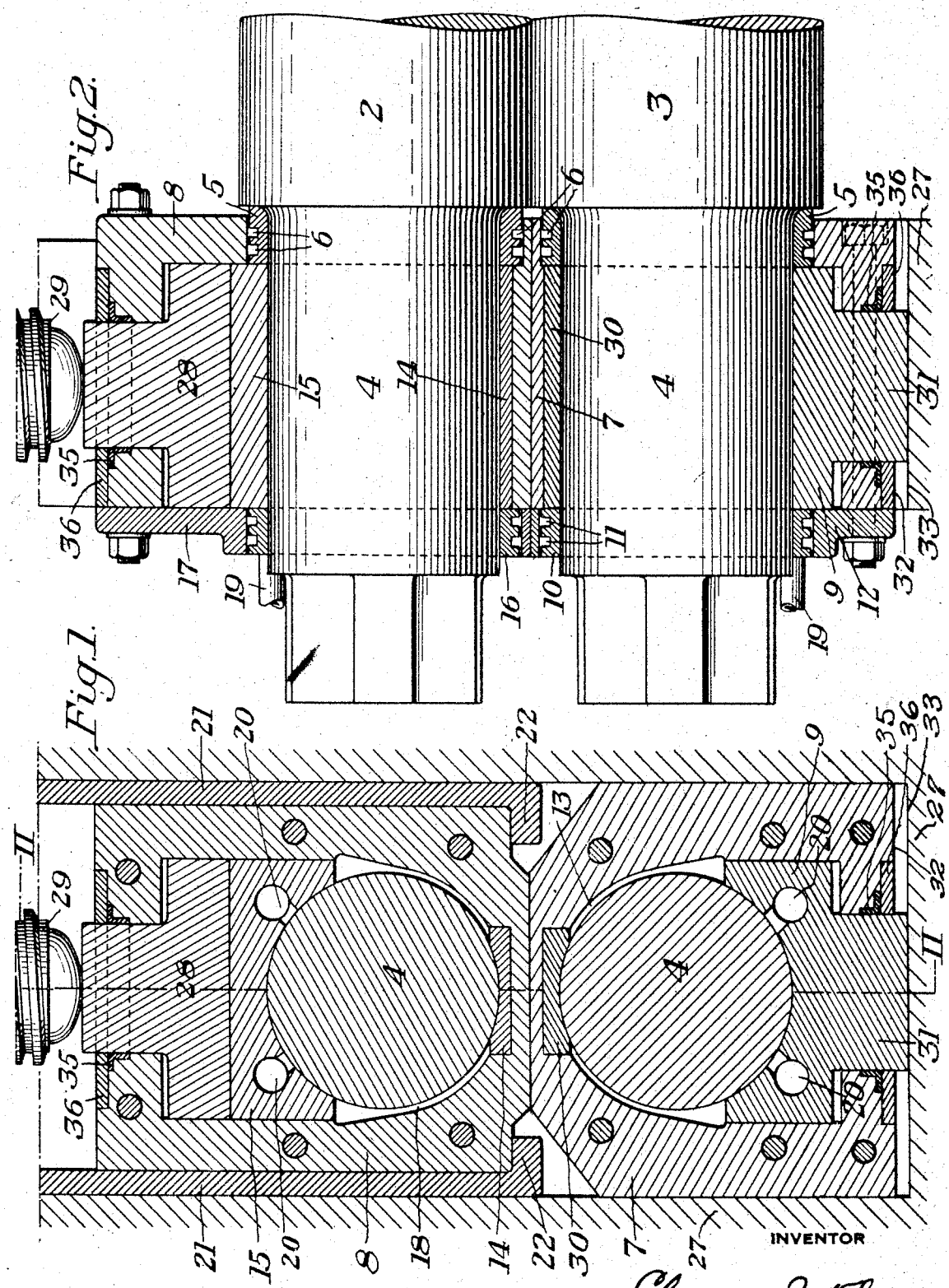

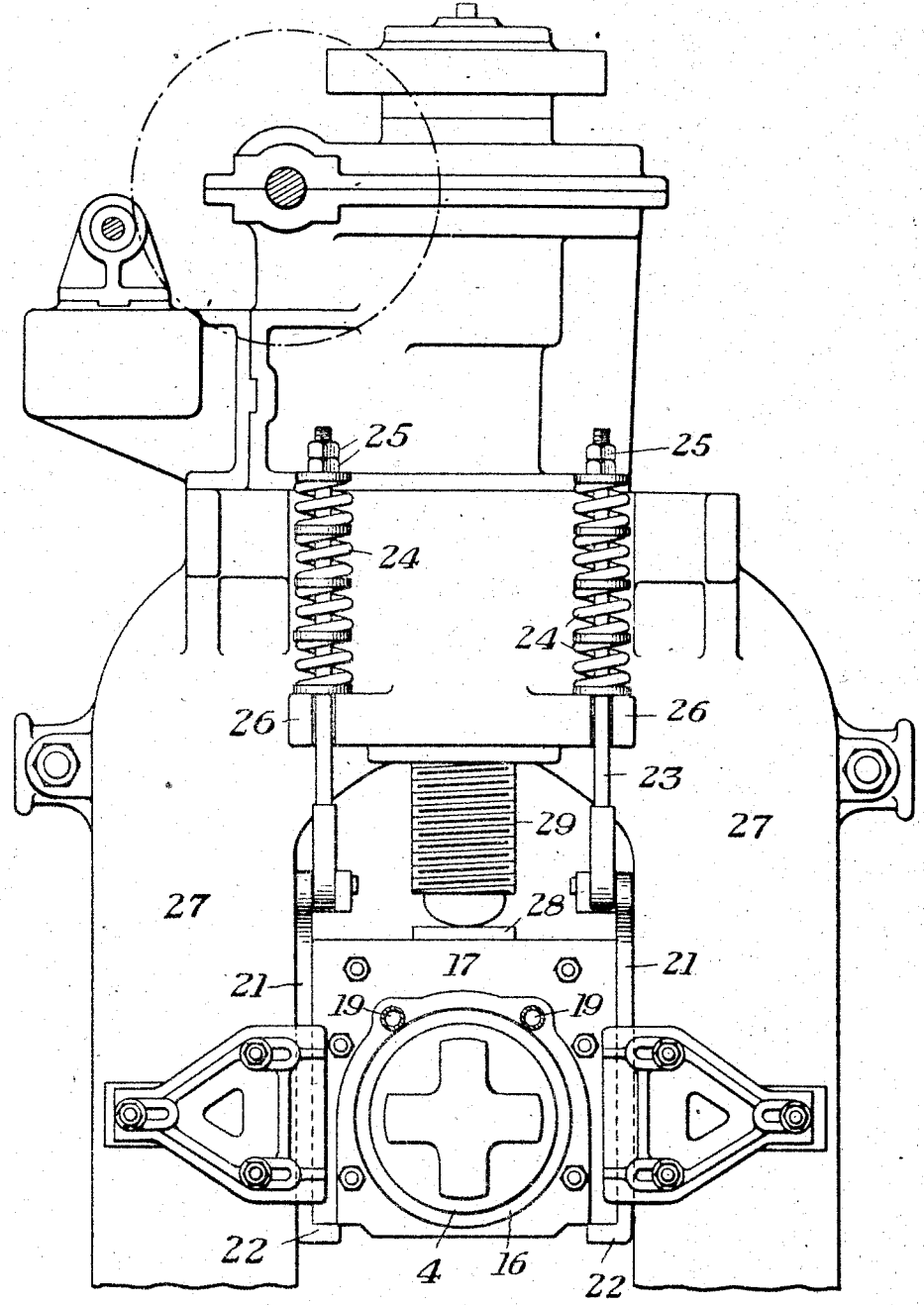

1,782,969

UNITED STATES PATENT OFFICE

CLARENCE J. KLEIN, OF BELLEVUE, PENNSYLVANIA, ASSIGNOR TO UNITED ENGINEERING AND FOUNDRY COMPANY, OF PITTSBURGH, PENNSYLVANIA, A CORPORATION OF PENNSYLVANIA

BEARING

Application filed October 15, 1927. Serial No. 226,323.

The present invention relates broadly to bearings, and more particularly bearings of the character applicable to mill rolls intended for comparatively heavy duty and in which it is desirable to provide not only means for maintaining effective lubrication but also means for effectively compensating for wear.

It is customary in the art to which the present invention relates, to provide mills comprising upper and lower rolls in which the upper rolls are counter-balanced or resiliently supported in such manner as to prevent undue jump of the upper roll upon the entry of a piece of material into the roll pass, or the discharge of the same therefrom. In such mills, considerable difficulty has been experienced in the maintenance of a sufficient supply of lubricant on the roll necks or for effectively compensating for wear thereof.

The present invention has for certain of its objects, the provision of an improved bearing applicable to a wide variety of uses, but particularly designed for use in rolling mills and effective for maintaining a supply of lubricant in position about the roll necks and for compensating for wear in the bearings during the operation of the cooperating parts.

In the accompanying drawings, there is shown for purposes of illustration only, a preferred embodiment of my invention, it being understood that the drawings do not define the limits of the invention as changes in the design, arrangement and construction of the parts may be made without departing either from the spirit of the invention or the scope thereof, as defined in the appended claims.

In the drawings—

Figure 1 is an end elevation largely diagrammatic, of one form of bearing embodying the present invention;

Figure 2 is a vertical sectional view on the line II—II of Figure 1;

Figure 3 is a diagrammatic end elevation showing one manner of supporting the upper roll; and Figure 4 is a side elevational view of the construction illustrated in Figure 3.

In accordance with the present invention, there may be provided suitable rotating parts to be supported, these parts being herein illustrated as comprising an upper roll 2 and a lower roll 3 each having a roll neck 4 of usual construction as well understood in the art.

Cooperating with each of the roll necks is an inner thrust ring 5 each provided on its periphery with grooves 6 adapted for the reception of rings, packing or the like effective for sealing the same against the loss of lubricant. These thrust rings are each supported in a casing or box which is preferably of a one-piece construction, there being a casing 7 for the lower roll and a similar casing 8 for the upper roll. Within the casing 7 is a brass or bearing member 9 which may be of any desired construction or material, bronze being ordinarily used for this purpose. The outer end of the neck 4 of the lower roll is adapted to receive a sealing ring 10 having peripheral grooves 11 similar to the grooves 6 before referred to. The outer ring 10 may be surrounded by a cover plate 12 suitably secured to the casing 7 in any desired manner. Inasmuch as the pressure on the lower roll is exerted downwardly, the casing 7 may be shaped to provide clearance 13 between the same and the upper part of the roll neck 4 whereby the weight of the roll is directly transmitted to the brass 9.

Mounted within the casing 8 for the upper roll, is a lower brass 14 and an upper brass 15. The end of the upper roll also carries an outer ring 16 surrounded by a suitable plate 17. It will be apparent that only the weight of the roll is carried by the lower brass 14, the main load with the mill in operation being taken by the upper brass 15. In view of this, the parts may be constructed to provide substantial clearance 18 for the lower part of the upper roll neck 4, substantially as indicated in Figure 1.

The construction disclosed, including the rings 5, 10 and 16, with their peripheral grooves and sealing means thereon, constitutes an effective seal for the bearing portion of each of the necks 4 and enables lubricant to be effectively maintained thereon. For supplying this lubricant, the bearings 9 and 15 may be provided with suitable fittings 19 adapted to receive lubricant under pressure, the fittings communicating with suitable distributing ports 20 for delivering the lubricant to the roll necks.

For holding the upper roll in its desired position, there may be provided depending supports 21 formed with hook-shaped lower ends 22 adapted to extend under the casing 8. The upper ends of the supports 21 may project laterally as clearly shown in Figure 4 for connection with tension rods 23 adapted to engage springs 24, the degree of compression of which may be variably adjusted by nuts 25 for counterbalancing to the desired extent the weight of the upper roll. It will be apparent that the lower ends of the springs 24 cooperate with suitable projections 26 on the roll housing 27 whereby the desired support is provided.

Inasmuch as in a construction of the character indicated the major portion of wear with respect to the bearing for the upper roll is concentrated on the brass 15, it is desirable to provide means for compensating for such wear. This may be accomplished by utilizing thrust blocks 28 extending upwardly through a suitable opening in the casing 8 and directly engaging the upper surface of the brass 15. Each of these thrust blocks may be engaged by a screw 29 of such construction as to resist the upward thrust of the roll.

The lower brass 9 may likewise be supported to compensate for wear in a manner generally similar to that provided for the upper brass 15. Such results may be accomplished by providing the brass 9 with a projection 31 adapted to extend through a suitable opening in the casing 7. As originally constructed, the projection 31 will preferably have a length such as to maintain the lower surface 32 of the casing 7 in spaced relation to the surface 33 of the housing 27, whereby as the brass 9 wears, the casing 7 may move downward with the roll to the extent permitted by the space between the surfaces 32 and 33. The projection 31 may be supported in any desired manner, but is preferably of such length as to directly engage the bottom of the window in the roll housing 27.

The brass 30 carries the weight of the casing 7 and transfers it to the roll neck 4.

Since the present invention has for one of its objects the provision of means for maintaining lubricating material in contact with the rolls, both the thrust block 28 and the projection 31 cooperate with packing rings 35 and keeper plates 36 to prevent the leakage of lubricant past the same.

It will be apparent to those skilled in the art that the construction described provides an oil tight casing for each of the rolls and that each casing includes means in the form of a brass or bearing member for taking the main radial load transmitted thereto, and other means of a generally similar nature for taking the auxiliary axial or thrust load in a direction different from the main radial load.

Certain advantages of the present invention arise from the provision of an improved bearing adapted for the reception of lubricant under pressure and effective for maintaining the same in position.

Other advantages of the invention arise from the provision of a bearing particularly suitable for use with a mill roll and comprising an enclosed casing for the upper roll neck together with means for compensating for the wear of the brasses therein.

Still other advantages arise from the provision of an improved bearing for mill rolls having means for effectively supporting the rolls and for lubricating the same during the operation of the mill.

A still further advantage of the present invention arises from the provision of improved bearings of such construction that compensation for wear is automatically obtained either with respect to the lower roll or the upper roll to thereby maintain all of the bearing parts in the desired relation at all times.

I claim:

1. A composite roll bearing for rolling mills, comprising an oil tight casing, a main and an auxiliary brass within the casing, said main brass extending beyond the casing, whereby the load on it can be transferred to a support independent of the casing.

2. A composite roll bearing for rolling mills, comprising an oil tight casing, main and auxiliary brasses within the casing, said main brass extending through one wall of the casing, a roll, oil sealing means between the casing and the roll, and oil sealing means between the casing and the said main brass.

3. A composite roll bearing for rolling mills, comprising an oil tight casing, main and auxiliary brasses within the casing, the said casing having a plurality of openings for the roll neck and having an opening for a telescopic movement of the main brass, and oil sealing means for all of said openings.

4. In rolling mills, a two high roll stand comprising roll housings and rolls, encased bearings for the rolls including floating casings, and main and auxiliary brasses mounted in said floating casings, the major portion of the rolling pressure being transmitted directly to the housings through the main brasses independently of the bearing casings, said casings being arranged to float with the roll journals.

5. In rolling mills, a two high roll stand comprising roll housings and rolls, encased bearings for the rolls including floating casings, and main and auxiliary brasses mounted in said floating casings, the said main brasses taking radial load due to rolling, the said auxiliary brasses in the upper and lower casings taking the weight of the upper roll and the weight of the lower casings respectively.

6. In a rolling mill, a two high roll stand comprising roll housings and rolls, encased bearings for the rolls including floating casings, a main brass for each roll mounted in said casings, the main brasses for the upper and lower rolls transmitting rolling pressure to the housing directly and independently of the casings, and an auxiliary brass for each roll mounted in said casings, the auxiliary brass for the upper roll supporting the weight of said roll when idle and the auxiliary brass for the lower roll supporting the casing for such roll.

In testimony whereof I have hereunto set my hand.

CLARENCE J. KLEIN.